(12) United States Patent
Ley et al.

(10) Patent No.: US 10,387,853 B1
(45) Date of Patent: Aug. 20, 2019

(54) SECONDARY PURCHASE CARD FOR FINANCIAL TRANSACTIONS ("CAP CARD")

(75) Inventors: Michael Scott Ley, Moon Township, PA (US); Christine Johns, Allison Park, PA (US); Bryan L. Mackrell, Cranberry Township, PA (US); Michael Aaron Chapman, Chicago, IL (US); Hyun Jin Ko, Evanston, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1191 days.

(21) Appl. No.: 12/689,375

(22) Filed: Jan. 19, 2010

(51) Int. Cl.
*G06Q 20/10* (2012.01)
(52) U.S. Cl.
CPC .................. *G06Q 20/102* (2013.01)
(58) Field of Classification Search
CPC .................................................. G06Q 20/102
USPC ........................................................... 705/41
See application file for complete search history.

(56) References Cited

U.S. PATENT DOCUMENTS

| | | | |
|---|---|---|---|
| 3,719,927 A * | 3/1973 | Michels | G06Q 20/40 340/5.4 |
| 4,367,402 A | 1/1983 | Giraud et al. | |
| 4,443,027 A | 4/1984 | McNeely et al. | |
| 4,837,422 A | 6/1989 | Dethloff et al. | |
| 5,500,513 A | 3/1996 | Langhans et al. | |
| 5,621,640 A | 4/1997 | Burke | |
| 5,649,118 A | 7/1997 | Carlisle et al. | |
| 5,845,260 A | 12/1998 | Nakano et al. | |
| 5,953,710 A | 9/1999 | Fleming | |
| 5,963,925 A | 10/1999 | Kolling et al. | |
| 5,991,749 A | 11/1999 | Morrill, Jr. | |
| 6,032,134 A | 2/2000 | Weissman | |
| 6,052,675 A | 4/2000 | Checchio | |
| 6,088,682 A | 7/2000 | Burke | |
| 6,112,191 A | 8/2000 | Burke | |
| 6,128,603 A | 10/2000 | Dent et al. | |

(Continued)

FOREIGN PATENT DOCUMENTS

WO  WO 96/34358 A1  10/1996
WO  WO 03/030054 A1  4/2003

OTHER PUBLICATIONS

U.S. Appl. No. 12/689,380, filed Jan. 19, 2010.

(Continued)

*Primary Examiner* — Kirsten S Apple
*Assistant Examiner* — Martin A Gottschalk
(74) *Attorney, Agent, or Firm* — Buchanan Ingersoll & Rooney PC; Robert J. Pugh (57) ABSTRACT

Strategies, tools and techniques for establishing purchase cards for customers of a financial institution are provided. A primary purchase card can be established for a customer in association with at least one account of the financial institution. Also, at least one secondary purchase card can be established for the customer in addition to the primary purchase card. The secondary purchase card can be linked to the primary purchase card and to at least one of the same accounts associated with the primary purchase card. Customer configuration of various rules for the secondary purchase card can be facilitated, such as rules that govern purchase limits, activation parameters, deactivation parameters, and/or automatic replenishment schedules for the secondary purchase card.

17 Claims, 5 Drawing Sheets

(56) References Cited

U.S. PATENT DOCUMENTS

| | | | |
|---|---|---|---|
| 6,173,269 B1 | 1/2001 | Solokl et al. | |
| 6,353,811 B1 | 3/2002 | Weissman | |
| 6,411,938 B1 | 6/2002 | Gates et al. | |
| 6,493,685 B1 | 12/2002 | Ensel et al. | |
| 6,636,833 B1 | 10/2003 | Flitcroft et al. | |
| 6,742,704 B2 | 6/2004 | Fitzmaurice et al. | |
| 6,839,687 B1 | 1/2005 | Dent et al. | |
| 6,839,692 B2 | 1/2005 | Carrott et al. | |
| 6,876,971 B1 | 4/2005 | Burke | |
| 6,945,453 B1* | 9/2005 | Schwarz, Jr. | 235/375 |
| 6,993,510 B2 | 1/2006 | Guy et al. | |
| 7,031,939 B1 | 4/2006 | Gallagher et al. | |
| 7,039,440 B2 | 5/2006 | Rodriguez et al. | |
| 7,076,465 B1 | 7/2006 | Blagg et al. | |
| 7,110,979 B2 | 9/2006 | Tree | |
| 7,146,338 B2 | 12/2006 | Kight et al. | |
| 7,147,149 B2 | 12/2006 | Giraldin et al. | |
| 7,171,370 B2 | 1/2007 | Burke | |
| 7,175,073 B2 | 2/2007 | Kelley et al. | |
| 7,249,092 B2 | 7/2007 | Dunn et al. | |
| 7,249,097 B2 | 7/2007 | Hutchison et al. | |
| 7,264,153 B1 | 9/2007 | Burke | |
| 7,328,839 B2 | 2/2008 | Keohane et al. | |
| 7,401,731 B1 | 7/2008 | Pletz et al. | |
| 7,502,758 B2 | 3/2009 | Burke | |
| 7,536,351 B2 | 5/2009 | Leblang et al. | |
| 7,571,849 B2 | 8/2009 | Burke | |
| 7,801,814 B2 | 9/2010 | Cataline et al. | |
| 7,809,641 B2 | 10/2010 | Sanders et al. | |
| 7,827,102 B2 | 11/2010 | Saliba et al. | |
| 7,954,704 B1* | 6/2011 | Gephart et al. | 235/380 |
| 8,015,084 B1* | 9/2011 | Hirka et al. | 705/35 |
| 8,065,230 B1 | 11/2011 | Little | |
| 2001/0047310 A1 | 11/2001 | Russell | |
| 2002/0123949 A1 | 9/2002 | VanLeeuwen | |
| 2003/0014323 A1* | 1/2003 | Scheer | G06Q 30/06 705/15 |
| 2003/0050889 A1 | 3/2003 | Burke | |
| 2003/0055735 A1* | 3/2003 | Cameron et al. | 705/26 |
| 2003/0083930 A1 | 5/2003 | Burke | |
| 2004/0019543 A1 | 1/2004 | Blagg et al. | |
| 2006/0054687 A1* | 3/2006 | Betti et al. | 235/380 |
| 2006/0122923 A1 | 6/2006 | Burke | |
| 2006/0293956 A1* | 12/2006 | Walker et al. | 705/14 |
| 2007/0034688 A1 | 2/2007 | Burke | |
| 2007/0055439 A1* | 3/2007 | Denker et al. | 701/200 |
| 2007/0061252 A1 | 3/2007 | Burke | |
| 2007/0061257 A1 | 3/2007 | Neofytides et al. | |
| 2007/0083465 A1 | 4/2007 | Ciurea et al. | |
| 2007/0088624 A1* | 4/2007 | Vaughn et al. | 705/26 |
| 2007/0094130 A1 | 4/2007 | Burke | |
| 2007/0100749 A1 | 5/2007 | Bachu et al. | |
| 2007/0133767 A1* | 6/2007 | Hahn et al. | 379/114.2 |
| 2007/0162387 A1 | 7/2007 | Cataline et al. | |
| 2007/0214162 A1 | 9/2007 | Rice | |
| 2007/0235524 A1* | 10/2007 | Little | G06Q 20/04 235/380 |
| 2007/0239575 A1* | 10/2007 | Claridge | G06Q 20/102 705/35 |
| 2008/0120129 A1 | 5/2008 | Seubert et al. | |
| 2008/0182551 A1* | 7/2008 | Lovell | 455/407 |
| 2009/0063342 A1* | 3/2009 | Beckers | 705/41 |
| 2009/0204538 A1 | 8/2009 | Ley et al. | |
| 2009/0245029 A1* | 10/2009 | Kam | G06K 19/07 368/10 |
| 2010/0197383 A1* | 8/2010 | Rader et al. | 463/25 |
| 2011/0010761 A1* | 1/2011 | Doyle | 726/5 |

OTHER PUBLICATIONS

U.S. Appl. No. 13/300,940, filed Nov. 21, 2011.
Office Action dated Mar. 12, 2012 for U.S. Appl. No. 13/300,940, filed Nov. 21, 2011.
Office Action dated Apr. 5, 2012 for U.S. Appl. No. 12/689,380, filed Jan. 19, 2010.
Ronald Lipman, "Adding family to credit card not always wise," Houston Chronicle, dated Jan. 18, 2008, printed from chron.com, 2 pages.
Lawrence Kutner, "Parent & Child," The New York Times, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," The Wall Street Journal, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=Home Page, Internet site, accessed on Apr. 11, 2008, 1 page.
"Use Buxfer's analytics to understand your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reportinq, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http:/www.buxfer.com/tour.php?=Filters, Internet site, accessed on Apr. 11, 2008, 1 page.
"Transfer money online with Amazon Payments," printed from http://www.buxfer.com/tour.php?id=Send_money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPay Works—PayPal," printed from https://www.paypal.com/us/cgi-bin/webscr?cmd=xpt/cps/general/NewConsumerWorks-outside, Internet site, accessed on Sep. 18, 2007, 3 pages.

(56) References Cited

OTHER PUBLICATIONS

"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=_flow&SESSION=6paX9BKc4FK4EJ8, Internet site, accrssed on Sep. 18, 2007, 1 page.
"Review Payment Details—PayPal," printed from https://www.paypal.com/us/cgi-bin/webscr?cmd=_flow&SESSION=RMXX7KRmlnYnF, Internet site, accessed on Sep. 18, 2007, 1 page.
"Savings Plan," printed from http:/quicken.intuit.com/images/screenshots/ss_savings_plan_lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.
John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.
"Ducont—Mobile Payments," printed from http://www.ducont.com/Products/bnf_mdhm.htm, Internet site, accessed on Oct. 11, 2007, 1 page.
"Ducont—Bank.companion," printed from http://www.ducont.com/Products/bnf_bankcomp.htm, Internet site, accessed on Oct. 11, 2007, 1 page.
"MyCheckFree.com," printed from https://mycheckfree.com/br/wps?sp=10001&rq=bfbl, Internet site, accessed on Sep. 14, 2007, 1 page.
"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.
"MyCheckFree—Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 pages.
"Paytrust : Paying Bills Has Never Been Easier," printed from http://www.paytrust.com/learnmore.shtml, Internet site, accessed on Sep. 14, 2007, 2 pages.
"Why Use Paytrust® Instead of a Traditional Bill-Pay Service?" printed from http://www.paytrust.com/morethanbillpay.shtml, Internet site, accessed on Sep. 14, 2007, 3 pages.
"Paytrust: Frequently Asked Questions," printed from http://www.paytrust.com/commonquestions.shtml, Internet site, accessed on Sep. 14, 2007, 5 pages.
Richard Irons, "What is Envelope Budgeting—Why the Envelope Budgeting System is so Effective?" printed from http://www.mvelopes.com/articles/envelope-budgeting.php, Internet site, 3 pages.
"Pocket Quicken," printed from http://www.landware.com/pocketquicken, Internet site, accessed on Sep. 14, 2007, 2 pages.
"Mobile Quicken™—Stand Alone or Connect with a Click," printed from http://www.landware.com/pocketquicken/moreinfo.html, Internet site, accessed on Sep. 14, 2007, 4 pages.
"UnitedOne Credit Union," printed from http://www.unitedone.org/ASP/home.asp, Internet site, accessed on Sep. 14, 2007, 3 pages.
"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.
"Quicken Starter Edition 2008," printed from http://quicken.intuit.com/personal-finance/starter-edition-personal-budget.jhtml, Internet site, accessed on Sep. 14, 2007, 5 pages.
"Jul. 2007 calendar," printed from http://quicken.intuit.com/images/screenshots/ss_calendar_lrg.gif, Internet site, accessed on Sep. 14, 2007, 1 page.
"Navigator," dated Jul. 2006, printed from www.pscu.org, Internet site accessed on Oct. 17, 2007, 2 pages.
"Bank of America Privacy Assist Premier™—Protect your credit and identity," printed from http://www.bankofamerica.com/pap/index.cfm?template=pap_assist_premier, Internet site, accessed on Oct. 17, 2007, 2 pages.
"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.
"Bank of America—Online Bill Pay and e-Bills Frequently Asked Questions," printed from http://www.bankofamerica.com/onlinebanking/index.cfm?template=faq_billpay, Internet site, accessed on Oct. 17, 207, 2 pages.
"Technology Credit Union," printed from http://www.techcu.com/resources/about_tech_cu/privacy/online.htm, Internet site, accessed on Oct. 17, 2007, 1 page.
"Billshare.org—Make Bill Paying with Roomies Easy—KillerStartups.com," printed from http://www.killerstartups.com/Web20/billshare--Make-Bill-Paying-with-Roomies-Easy/, Internet site, accessed on Sep. 18, 2007, 4 pages.
Every Penny Counts, Inc., Patent Property Due Diligence Chart, prepared Aug. 30, 2007, 8 pages.
Tom Rawstorne, "What's your child buying online?; Alcohol, knives, pornography . . . All bought over the Internet by a 14-year-old boy using a debit card. So why are the banks giving them to children without telling their parents?" *Daily Mail*, London, Jul. 10, 2008, p. 50, retrieved Jun. 30, 2011, 5 pages.

\* cited by examiner

SECONDARY PURCHASE CARD FOR FINANCIAL TRANSACTIONS ("CAP CARD")

FIELD OF THE INVENTION

The invention generally relates to systems, processes, tools, techniques and strategies for managing financial resources. In various embodiments, the invention more particularly relates to purchase cards for performing financial transactions, such as the purchase of goods or services.

BACKGROUND

Consumer spending is an important component of modern worldwide economies. Both individually and collectively, consumers have significant assets and financial resources at their disposal that can be used to purchase a variety of goods and services.

The financial resources of consumers are often maintained and made available for use through checking accounts, savings accounts and other accounts held at different types of financial entities such as banking institutions. Effectively and efficiently managing these financial resources can be challenging, however, and many consumers accordingly rely on their banking institutions to provide tools that can help them manage their finances. Such tools need to be nimble and intelligent in their ability to provide ready access to consumer financial information. Also, the tools need to mesh well with the lifestyles of the consumers, especially in the context of applying consumer financial resources to purchase transactions.

In view of the issues described above, enhanced systems, processes, tools, techniques and strategies are needed for managing financial resources, including the resources and assets of consumers who employ purchase cards for purchase transactions.

BRIEF DESCRIPTION OF THE FIGURES

The utility of the embodiments of the invention will be readily appreciated and understood from consideration of the following description of the embodiments of the invention when viewed in connection with the accompanying drawings, wherein.

DESCRIPTION

Embodiments of the invention provide enhanced processes, methods, tools, strategies, techniques for more effectively and efficiently managing financial resources, including financial transactions involving purchase cards for purchasing goods or services.

In various embodiments, the invention provides computer-implemented methods and systems for establishing purchase cards for consumers through a financial institution. The method may include establishing a primary purchase card for a customer of the financial institution through a purchase card transaction system. The primary purchase card may be associated with at least one account (e.g., checking account, savings account, investment account, etc.) of the financial institution. The method may also include establishing at least one secondary purchase card for the customer in addition to the primary purchase card. The secondary purchase card can be linked to the primary purchase card and to at least one of the same accounts associated with the primary purchase card. The method may also facilitate customer configuration of various rules for the secondary purchase card, such as rules which govern purchase limits, activation parameters, deactivation parameters, and/or automatic replenishment schedules for the secondary purchase card.

As applied herein, the term "purchase card" is intended to broadly encompass, for example and without limitation, credit cards, debit cards, discount cards, membership cards, and other like instruments. In various embodiments of the invention, a purchase card may be any instrument or device that can be configured for use in association with purchasing goods or services by drawing or applying funds or credit from an account (e.g., a checking account of a financial institution, or a credit account of a credit card company).

Figure 1:
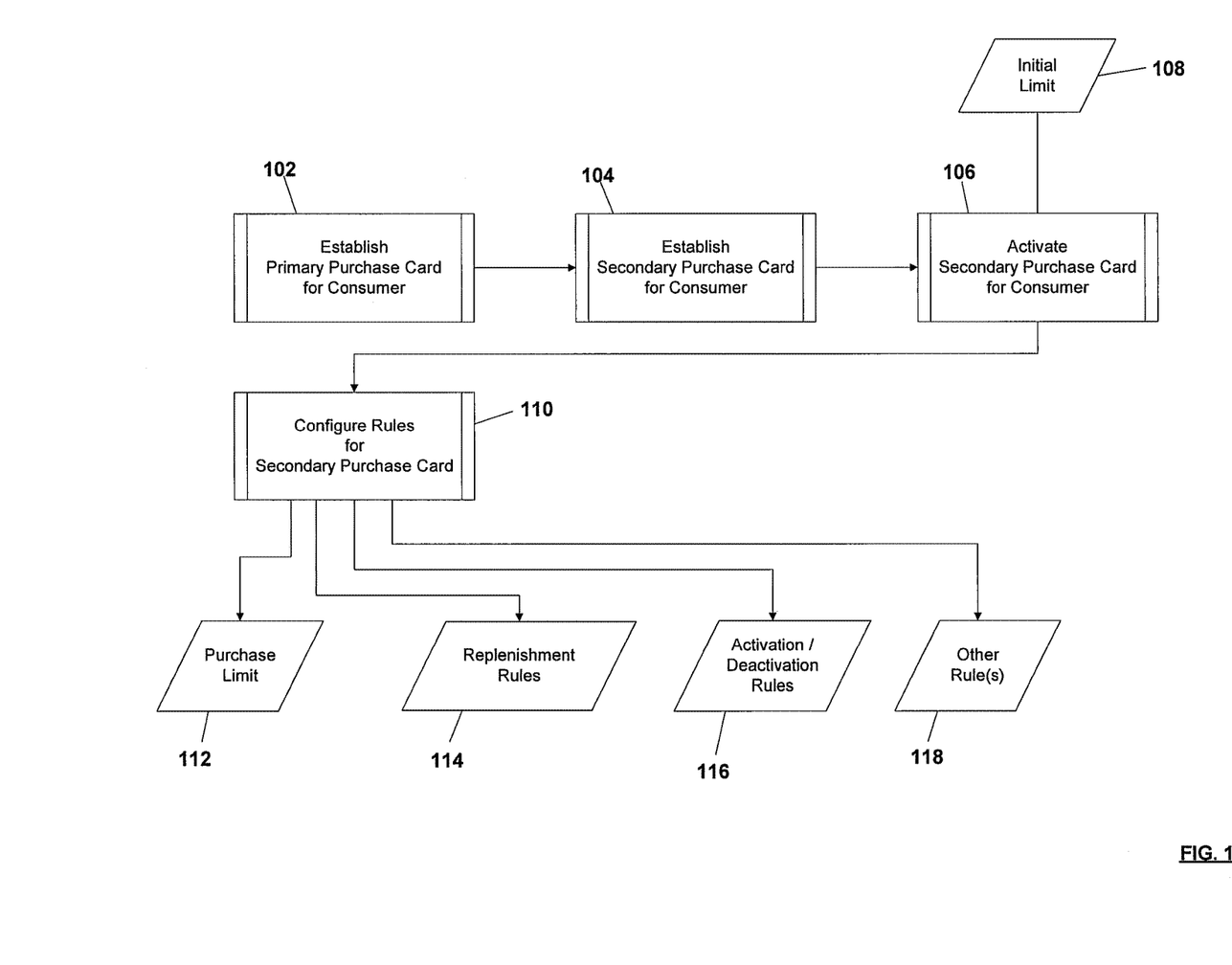
FIG. 1 includes a process flow diagram illustrating an example of a process that may be executed in accordance with certain embodiments of the invention.
Figure 2:
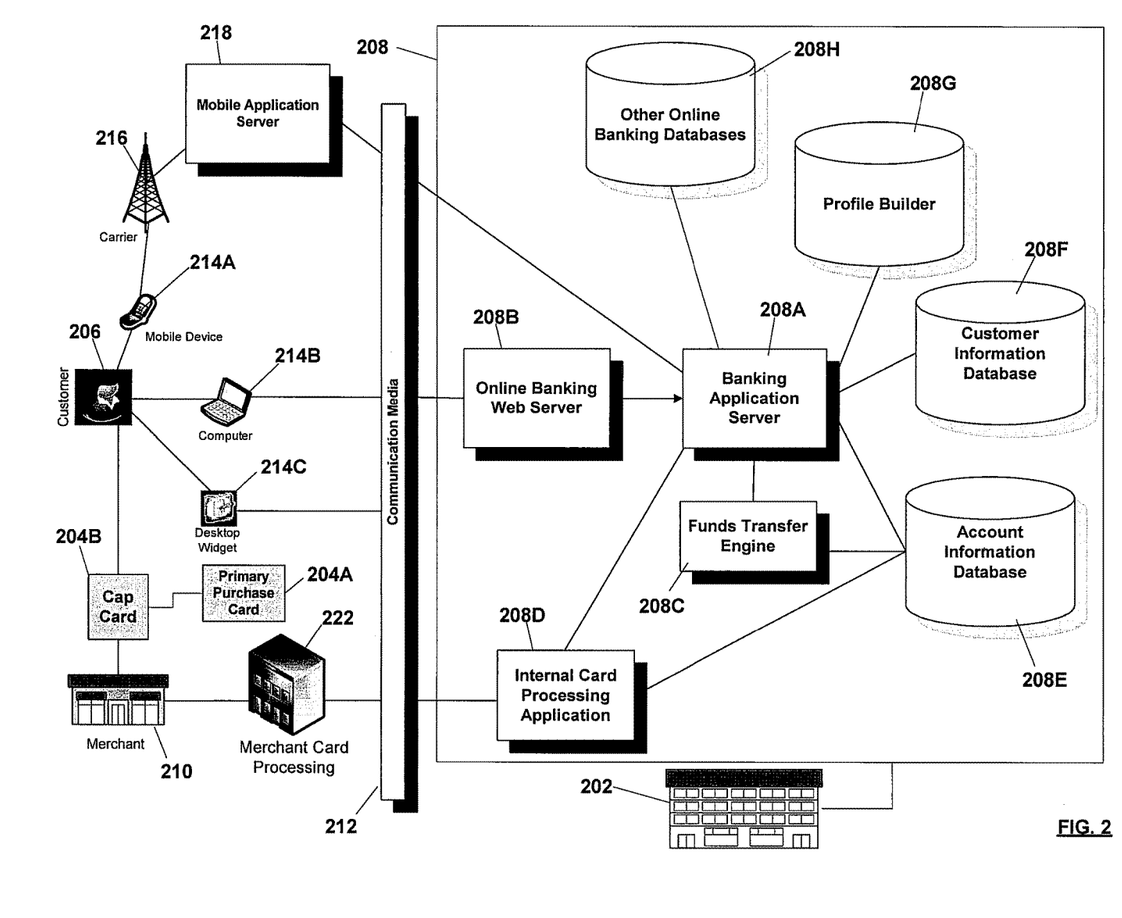
FIG. 2 includes a schematic system diagram illustrating an example of a data communication and data processing architecture structured in accordance with certain embodiments of the invention.

With reference to FIGS. 1 and 2, at step 102 a financial institution 202 can establish a primary purchase card 204A for a customer 206 of the financial institution 202 through a purchase card transaction system 208 of the financial institution 202. The financial institution 202 may be a banking institution, a commercial bank, or a consumer banking entity, for example. The primary purchase card 204A may be configured to allow the customer 206 to conduct transactions involving the purchase of goods or services from a variety of different merchants 210. For example, the primary purchase card 204A may be embodied as a debit card that permits the customer 206 to draw funds or apply debit transactions against one or more accounts which the customer 206 maintains through the financial institution 202. In certain embodiments, such accounts may be checking accounts, savings accounts, combinations of accounts, or another account of the financial institution 202.

Figure 3:
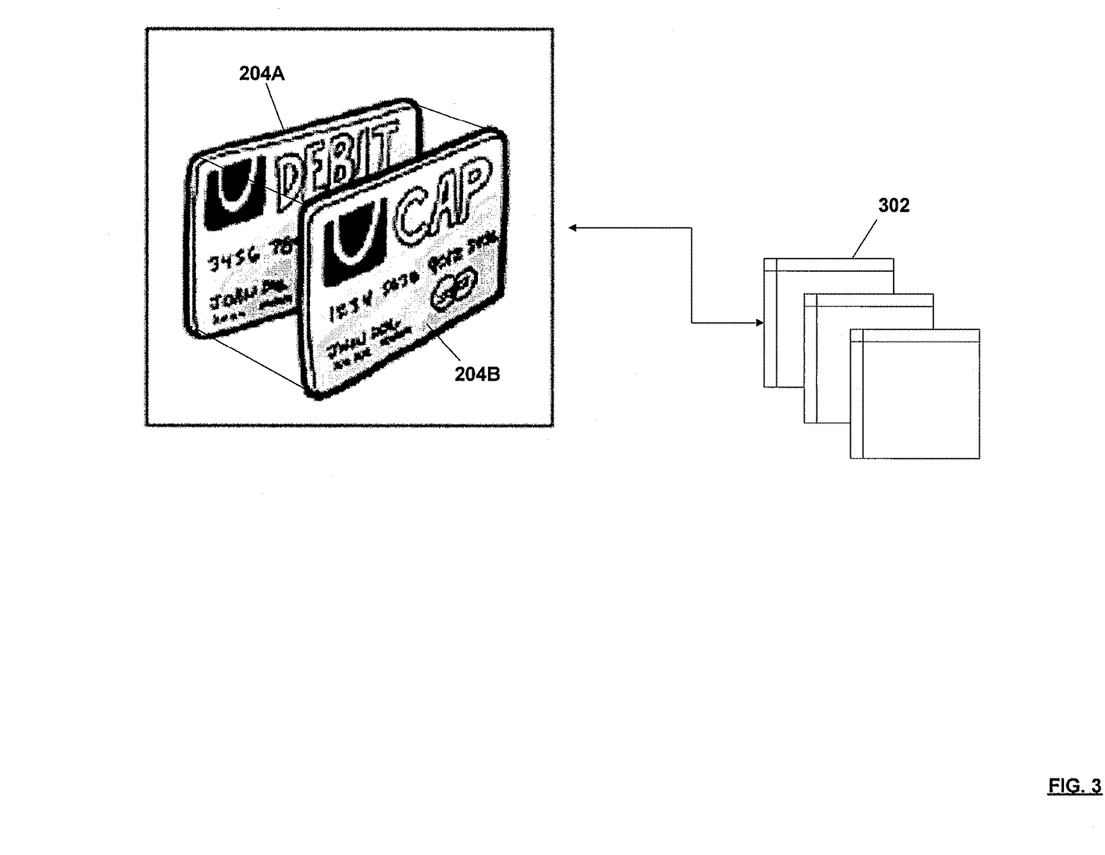
FIG. 3 includes a schematic illustrating linking among a primary purchase card, a secondary purchase card, and an account of a financial institution in accordance with certain embodiments of the invention.

At step 104, at least one secondary purchase card 204B (at times referred to herein as a "Cap Card" purchase card) may be established for the customer 206 in addition to the primary purchase card 204A. In various embodiments, the secondary purchase card 204B can be linked to the primary purchase card 204A and to the same account or accounts of the financial institution 202 associated with the primary purchase card 204A. The secondary purchase card 204A may be embodied as the same type of card as the primary purchase card 204A (e.g., a debit card). FIG. 3 schematically illustrates the link between/among the primary purchase card 204A, the secondary purchase card 204B, and an account 302 of the financial institution 202. At step 106, the secondary purchase card 204B can be activated with an initial predetermined amount or limit 108 that can be used for purchases of goods or services to be applied against the account 302 linked to the secondary purchase card 204B. For example, the amount of the limit 108 authorized to be applied against the account 302 may be set as a specific dollar amount (e.g., $500) or as a percentage of the account 302 balance (e.g., in the range of 20%-50% of the balance).

At step 110, the purchase card transaction system 208 may facilitate configuring one or more rules for the secondary purchase card 204B. Such rules may govern the amount available or purchase limit on the secondary purchase card 204B for purchases (e.g., at step 112); how and when the secondary purchase card 204B is replenished (e.g., at step 114); and/or to designate circumstances under which the secondary purchase card 204B may be activated or deactivated (e.g., at step 116); among other rules which can be configured (e.g., at step 118) for the secondary purchase card 204B.

For example, in various embodiments when the purchase limit for the secondary purchase card 204B configured at step 112 is reached, the secondary purchase card 204B may be configured to lose the capacity to make purchase transactions or perform other transactions until the secondary purchase card 204B is automatically replenished subject to an automatic replenishment schedule, replenished by the user 206, or otherwise reactivated for use. It can be seen that such a limit can be useful if the secondary purchase card 204B is lost, stolen or used by an unauthorized user. In another example, placing a limit on the secondary purchase card 204B allows parents to give the secondary purchase card 204B to their children as a form of "pocket money" that the children can use for purchases. In certain embodiments, the limit on the secondary purchase card 204B may be a hard stop or defined limit that deactivates the secondary purchase card 204B and prevents the user 206 from over spending, for example. In other embodiments, the limit established for the secondary purchase card 204B at step 112 may be a virtual stop that provides a warning to the user 206 that the limit has been reached but permits the user 206 to continue using the secondary purchase card 204B for purchase transactions. In various embodiments, the virtual stop feature may be coupled with requiring the user 206 to verify through a password, biometric scan, or other authorization that the secondary purchase card 204B should remain active for purchase transactions once the limit has been reached.

In certain embodiments, one or more rules can be configured at step 114 that designate an automatic replenishment schedule for the secondary purchase card 204B, so that cash or money can be flowed into the secondary purchase card 204B at a preset time and amount. The secondary purchase card 204B may be embodied as a debit card, for example, with a rule to transfer a set amount of cash to the debit card from a checking account according to a prescribed schedule. In various embodiments, if the purchase limit for the secondary purchase card 204B is not reached within a predetermined time period (e.g., a week, month, quarter, etc.) or prior to a scheduled replenishment date, then the secondary purchase card 204B may be configured to be replenished only up to the limit. Also, the secondary purchase card 204B may be configured to not replenish the amount available for purchase transactions if more than a predetermined percentage (e.g., at least 50%) of the limit amount remains available on the secondary purchase card 204B. In certain embodiments, the secondary purchase card 204B may be configured to not replenish the amount available for purchase transactions if any positive amount remains available on the secondary purchase card 204B. In certain embodiments, the secondary purchase card 204B may be configured to add a new replenishment amount to the then current amount available on the purchase card 204B, which can be considered a rollover option which can be configured for the purchase card 204B.

In certain embodiments, the spending or use history of the secondary purchase card 204B can be tracked and analyzed by the financial institution 202 in connection with deciding how to replenish amount available on the secondary purchase card 204B. For example, the secondary purchase card 204B may be initially established with an amount available that is higher than or lower than the actual use history of the user of the secondary purchase card 204B. For example, the initial amount available may be on a replenishment schedule $1,000 per quarter; however, the user of the secondary purchase card 204B may only spend $500 of the amount available quarter. The purchase card transaction system 208 can be configured to automatically adjust the actual replenishment amount in response to the actual use history. In this example, the replenishment amount for the secondary purchase card 208 can be reduced by 50% to correspond with the actual use history as tracked by the financial institution 202.

In accordance with rules that may be configured at step 116, if the limit for the secondary purchase card 204B is reached during a purchase transaction (e.g., there is an insufficient balance or amount available to complete the purchase), then the secondary purchase card 204B can be configured: (i) to deactivate and not complete the transaction; (ii) to remain active and complete at least a portion of the transaction; (iii) or to draw the difference between the purchase amount required for the transaction and the amount available on the secondary purchase card 204B from another user 206 account, such as a checking account or savings of the user 206, for example.

The rules for the secondary purchase card 204B may be configured or adjusted by the customer 206 through the purchase card transaction system 208. In addition, functions such as displaying an available balance for the secondary purchase card 204B may be performed through the transaction system 208. As shown, the transaction system 208 may include a banking application server 208A configured to perform various functions and tasks within the system 208. For example, the banking application server 208A may be operatively associated with an online banking web server 208B which may be configured to send and receive communications through various communication media 212. Examples of communication media 212 may include, for example and without limitation, a wireless data network, a wireline network, and/or a networked medium or media, such as an Internet or intranet connection. In certain embodiments, the communication media 212 may be implemented using the Internet, although it will be understood that any public or private communication network suitable for enabling the electronic exchange of information between the transaction system 208 and the customers 206 using wireline and/or wireless communication channels may be used. The communication media 212 may be protected with one or more firewalls, for example, or other measures for promoting secure and/or authenticated communications. The transaction system 208 may be implemented by the bank or other financial institution 202 and configured to provide network-based product and service features to the customers 206.

The customers 206 may interact with the transaction system 208 through the communication media 212 by using one or more different types of access devices 214, such as a mobile device 214A (e.g., mobile phone, smart phone, cell phone, personal data assistant (PDA), etc.), a computer system 214B (e.g., laptop, desktop, notebook, etc.), and/or a desktop widget 214C. The access devices 214 may include a suitable browser software application (e.g., Internet Explorer) for enabling the access devices 214 to display and interact with information exchanged through the communication media 212. The customers 206 may thus access and navigate static and/or dynamic HTML documents on one or more different user interfaces generated by the purchase card transaction system 208 for display on the access device 214.

Figure 4:
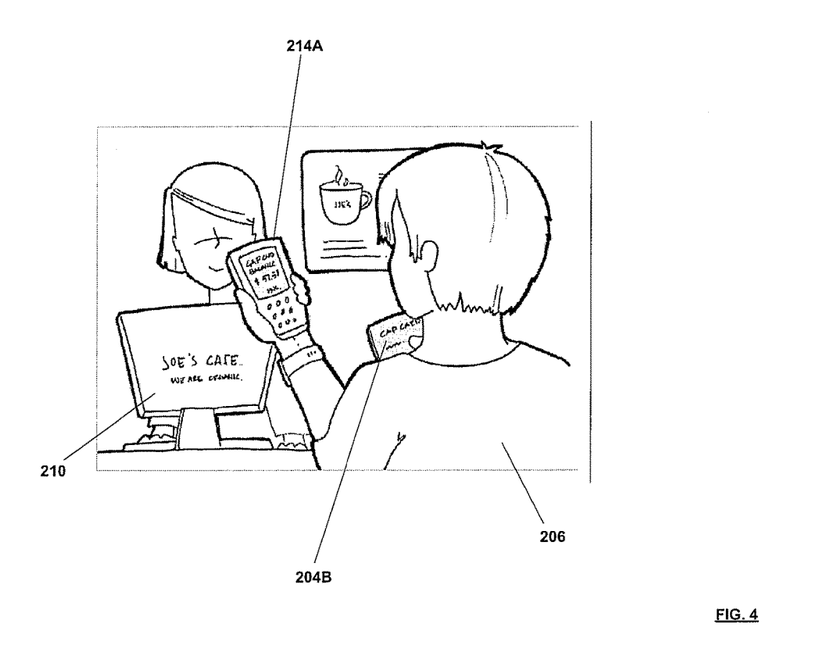
FIG. 4 includes a schematic illustrating an example of a customer using a secondary purchase card to interact with a merchant; and, FIG. 5 includes a schematic illustrating an example of a customer configuring a rule for a secondary purchase card through an access device.
Figure 5:
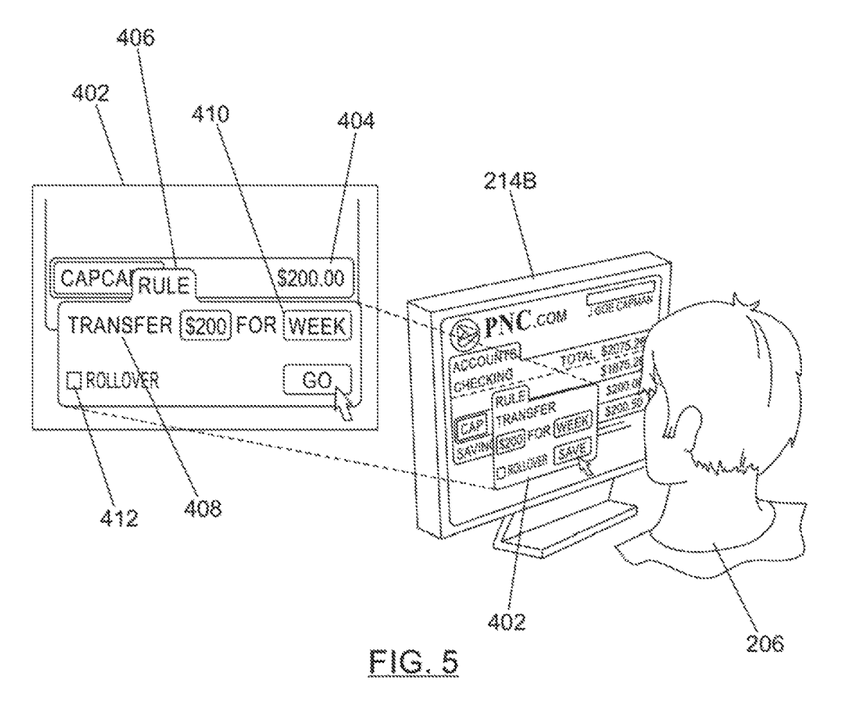

For example, the balance available for the secondary purchase card 204B may be displayed on the access device 214 through use of a mobile buffer short message service (SMS). As shown in the example of FIG. 2, the mobile device 214A may be configured to send or receive data through a mobile carrier 216. The mobile carrier 216 may be operatively associated with a mobile application server 218, which can be configured to exchange data between the purchase card transaction system 208 and the mobile carrier 216 and to facilitate communications sent to or received by the mobile device 214A. FIG. 4 schematically illustrates an example of a customer 206 purchasing goods at a merchant 210 with a secondary purchase card 204B, while using a mobile device 214A to check an available balance on the secondary purchase card 204B.

In various embodiments, the purchase card transaction system 208 may be based on a tiered-network architecture and may include the banking application server 208A, the online banking web server 208B, a funds transfer engine 208C, an internal card processing application 208D, and one or more data storage media 208E-208H, as shown in the system architecture example of FIG. 2.

The online banking web server 208B may correspond to a first tier of the purchase card transaction system 208 and may be configured to communicate with the communication media 212 and the banking application server 208A. The web server 208B may be configured to accept information requests (e.g., HTTP requests) from one or more of the access devices 214 via the communication network 212 and provide suitable responses thereto. The responses may include, for example, HTTP responses including static and/or dynamic HTML documents for providing an Internet banking user interface to the customers 206 through the access devices 214. The web server 208B may further be configured to authenticate credentials for the customers 206 before allowing access to user interfaces and other resources associated with the transaction system 208. Authentication may be performed, for example, using a user name and a password.

The banking application server 208A may correspond to another tier of the purchase card transaction system 208 and may be configured to communicate with the web server 208B and the databases 208E-208H. The application server 208A may host one or more applications executing logic to provide banking product and service features to customers 206 through the access devices 214. The application server 208A may receive and process user-entered information communicated through the web server 208B from the user interface displayed on each access device 214. Such communicated information may include, for example, requests to configure rules for the secondary purchase card 204B, requests to display account information and balances, a user name and password associated with the user 206, and/or requests to access other banking features and functions. Based on this and other information received from the customers 206, applications hosted and executed by the application server 208A may perform financial transactions (e.g., transfer funds between accounts, retrieve account balances, reconfigure automatic replenishment rules, etc.) and generate corresponding informational content (e.g., transfer confirmations, account balance information, replenishment updates, etc.). Information regarding such transactions may be communicated to the web server 208B and subsequently presented to the customers 206 using a dynamic web page interface, for example. In various embodiments, the funds transfer engine 208C may be embodied as a computer system that executes fund transfers within the transaction system 208 and/or updates account information (e.g., balance transfers) in the account information database 208E.

The databases 208E-208H may correspond to another tier of the purchase card transaction system 208, and the databases 208E-208H may be configured to communicate with the banking application server 208A to retrieve, store, or process data to support one or more applications hosted by the application server 208A or elsewhere in the system 208. The customer information database 208F may include data and other information related to names, addresses, and other demographic data associated with the customers 206. The profile builder database 208G may include data and other information related to customer preferences and account settings. In certain embodiments, one or more other databases 208H may also be provided within the transaction system 208, such as a database for storing rules configured in association with use and operation of the secondary purchase card 204B. Database 208E-208H information requested by a particular application or program of the application server 208A may be retrieved from the databases 208E-208H, communicated to the requesting application, and the databases 208E-208H may be subsequently updated by the application server 208A once processing of a task or function is completed.

In various embodiments, the internal card processing application 208D can be configured to receive purchase transaction data communicated from merchants 210 through a merchant card processing function 222. The internal card processing application 208D may receive requests for payment from the merchants 210 for purchase transactions, advise the banking application server 208A that purchase transactions have been initiated or consummated, and/or update the account information database 208E when purchase transactions occur.

FIG. 4 schematically illustrates an example of a user interface 402 that may be presented by the purchase card transaction system 208 to a customer 206 on a computer 214B. As shown, the user interface 402 may include a current balance display 404 for the secondary purchase card 204B. Also, a rule 406 may be configured on the user interface 402, such as by specifying a transfer amount or replenishment amount 408 (e.g., $200) to replenish the secondary purchase card 204B and a replenishment period 410 (e.g., per week). Also, the customer 206 may configure the rule 406 to activate or not activate a rollover option 412. The rollover option 412 may determine whether replenishment amounts 408 are to be added to the then current balance 404 on the secondary purchase card 204B, or if the balance 404 should be reset to the replenishment amount 408. The user interface 402 may be implemented, for example, as dynamic and/or static HTML web pages hosted by the web server 208B which can be made accessible to the access devices 214 subsequent to customer 206 authentication. Other examples of screens or tools which can be made accessible from the access devices 214 include financial calendar screens, account detail screens, bill scheduling and payments screens, and alert screens.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the, intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the purchase card transaction system, the mobile application server, the online banking web server, the banking application server, the funds transfer engine, the internal card processing application, and/or other computer systems, data storage media, or modules described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for managing financial resources of purchase cards for a customer of a financial institution, the method comprising:
   activating, with a purchase card transaction system including an electronic computer system and at least one electronic memory storage device, a primary purchase card for the customer of the financial institution, wherein the primary purchase card is associated with at least one account of the financial institution;
   activating at least one secondary purchase card for the customer with the purchase card transaction system in addition to the primary purchase card, wherein the secondary purchase card is linked to the primary purchase card and to at least one of the same accounts of the financial institution associated with the primary purchase card;
   configuring a rule for the secondary purchase card with the purchase card transaction system, wherein the at least one rule governs a purchase limit for the secondary purchase card for purchase transactions, wherein:
      the purchase limit of the secondary purchase card includes a virtual stop rule for providing a warning to the customer when the purchase limit has been reached while permitting the customer to continue using the secondary purchase card for purchase transactions once the purchase limit is reached; and
      when the purchase limit is reached during a purchase transaction, the secondary purchase card draws an amount that is a difference between an amount of a purchase transaction and an amount available on the secondary purchase card from the at least one account;
   configuring a rule for the secondary purchase card for adding a first preset replenishment amount to the then current balance of the secondary purchase card according to an automatic replenishment schedule, wherein the first preset replenishment amount of the secondary purchase card is automatically adjusted to a second preset replenishment amount in response to an actual use history of the secondary purchase card as tracked by the financial institution, wherein the second preset replenishment amount is a monetary sum of purchase transactions for a period of time that occurred in the past;
   wherein replenishment comprises cash or money to be flowed into the financial account associated with the secondary purchase card.

2. The method of claim 1, further comprising configuring a rule for the secondary purchase card for how and when the secondary purchase card is replenished.

3. The method of claim 1, further comprising configuring a rule for the secondary purchase card for designating circumstances under which the secondary purchase card is activated or deactivated.

4. The method of claim 1, further comprising configuring a rule for the secondary purchase card for deactivating the secondary purchase card when the purchase limit for the secondary purchase is reached.

5. The method of claim 4, further comprising configuring a rule for the secondary purchase card for deactivating the secondary purchase card until the secondary purchase card is automatically replenished subject to the aft automatic replenishment schedule.

6. The method of claim 1, wherein the virtual stop rule is coupled with a rule for requiring the customer to verify through a biometric scan that the secondary purchase card should remain active for purchase transactions.

7. The method of claim 1, further comprising configuring a rule for the secondary purchase card for replenishing the secondary purchase card up to the purchase limit if the purchase limit is not reached within a given time period.

8. The method of claim 1, further comprising configuring a rule for the secondary purchase card for replenishing the secondary purchase card up to the purchase limit if the purchase limit is not reached prior to a scheduled replenishment date.

9. The method of claim 1, further comprising configuring a rule for the secondary purchase card for not replenishing the purchase limit if more than 50% of the purchase limit amount remains currently available on the secondary purchase card.

10. The method of claim 1, further comprising configuring a rule for the secondary purchase card for not replenishing the purchase limit if any positive amount remains currently available on the secondary purchase card.

11. The method of claim 1, farther comprising configuring a rule for the secondary purchase card including a rollover option wherein a new replenishment amount is added to the then current amount available on the purchase card.

12. The method of claim 1, further comprising configuring a rule for the secondary purchase card wherein if the purchase limit is reached during a purchase transaction then the secondary purchase card deactivates and does not complete the transaction.

13. The method of claim 1, further comprising configuring a rule for the secondary purchase card wherein if the purchase limit is reached during a purchase transaction then the secondary purchase card remains active and completes at least a portion of the transaction.

14. The method of claim 1, wherein the primary purchase card is a debit card and the secondary purchase card is a debit card.

15. The method of claim 1, wherein the account includes a checking account.

16. A computer-implemented method for managing financial resources of purchase cards for a customer of a financial institution, the method comprising:
　activating a primary purchase card for the customer of the financial institution through an electronic purchase card transaction system of the financial institution, wherein the primary purchase card is associated with at least one account of the financial institution, wherein:
　　the electronic purchase card transaction system comprises an application server;
　　the customer interacts with the purchase card transaction system by using an access device to access and navigate at least one user interface generated by the purchase card transaction system; and
　　the application server performs financial transactions and generates corresponding informational content based on information received from the access device;
　activating at least one secondary purchase card for the customer with the purchase card transaction system, wherein the secondary purchase card is linked to the primary purchase card and to at least one of the same accounts of the financial institution associated with the primary purchase card;
　configuring at least one rule for the secondary purchase card with the purchase card transaction system, wherein the at least one rule governs a purchase limit for the secondary purchase card, wherein when the purchase limit is reached during a purchase transaction, the secondary purchase card draws an amount that is a difference between an amount of the purchase transaction and an amount available on the secondary purchase card from the at least one account; and
　configuring at least one rule for the secondary purchase card for adding a first preset replenishment amount to the then current balance of the secondary purchase card according to an automatic replenishment schedule, wherein the first preset replenishment amount of the secondary purchase card is automatically adjusted to a second preset replenishment amount in response to an actual use history of the secondary purchase card as tracked by the financial institution, wherein the second preset replenishment amount is a monetary sum of purchase transactions for a period of time that occurred in the past.

17. The method of claim 16, further comprising generating a warning to the customer when the purchase limit has been reached via a virtual stop rule.

\* \* \* \* \*